United States Patent
Liu et al.

(10) Patent No.: US 11,692,880 B2
(45) Date of Patent: Jul. 4, 2023

(54) 3D THERMAL DETECTION CIRCUITS AND METHODS

(71) Applicant: Taiwan Semiconductor Manufacturing Co., Ltd., Hsin-Chu (TW)

(72) Inventors: Szu-Lin Liu, Hsinchu (TW);
Jaw-Juinn Horng, Hsinchu (TW);
Yung-Chow Peng, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 17/140,722

(22) Filed: Jan. 4, 2021

(65) Prior Publication Data
US 2021/0123816 A1 Apr. 29, 2021

Related U.S. Application Data

(60) Continuation of application No. 16/378,277, filed on Apr. 8, 2019, now Pat. No. 10,883,884, which is a continuation of application No. 15/460,098, filed on Mar. 15, 2017, now Pat. No. 10,274,380, which is a division of application No. 14/055,909, filed on Oct. 17, 2013, now Pat. No. 9,599,517.

(51) Int. Cl.
*G01K 7/21* (2006.01)
*G01K 7/20* (2006.01)

(52) U.S. Cl.
CPC .................. *G01K 7/21* (2013.01); *G01K 7/20* (2013.01)

(58) Field of Classification Search
None
See application file for complete search history.

(56) References Cited

U.S. PATENT DOCUMENTS

| | | | |
|---|---|---|---|
| 4,947,063 A * | 8/1990 | O'Shaughnessy ... | H03K 17/163 326/103 |
| 5,259,210 A | 11/1993 | Ohya | |
| 5,770,802 A | 6/1998 | Berthold | |
| 5,831,570 A * | 11/1998 | Ammar ................. | F41G 7/2286 342/26 B |
| 6,008,685 A | 12/1999 | Kunst | |
| 2006/0219564 A1 * | 10/2006 | Feng ...................... | G01N 27/07 205/81 |
| 2007/0017668 A1 | 1/2007 | Park | |

(Continued)

*Primary Examiner* — Erica S Lin
(74) *Attorney, Agent, or Firm* — Duane Morris LLP

(57) ABSTRACT

A three-dimensional integrated circuit includes a first layer including at least one sensing element configured to output at least one temperature-dependent voltage; and a second layer disposed vertically with respect to the first layer and coupled to the first layer by at least one via. The second layer includes: a compare circuit configured to generate at least one intermediate voltage in response to comparing the at least one temperature-dependent voltage to a feedback voltage; a control circuit configured to generate at least one control signal in response to the intermediate voltage; and a switching circuit configured to couple a capacitor coupled to a feedback node to one of a first voltage supply and a second voltage supply in response to the at least one control signal to generate an output signal that is based on a temperature sensed by the sensing element.

20 Claims, 8 Drawing Sheets

(56) References Cited

U.S. PATENT DOCUMENTS

2009/0102780 A1\* 4/2009 Brown ................ G09G 3/3648
　　　　　　　　　　　　　　　　　345/101
2010/0231286 A1\* 9/2010 Kuusilinna ............ G01K 7/425
　　　　　　　　　　　　　　　　　327/512
2012/0044012 A1　2/2012 Shibayama \* cited by examiner

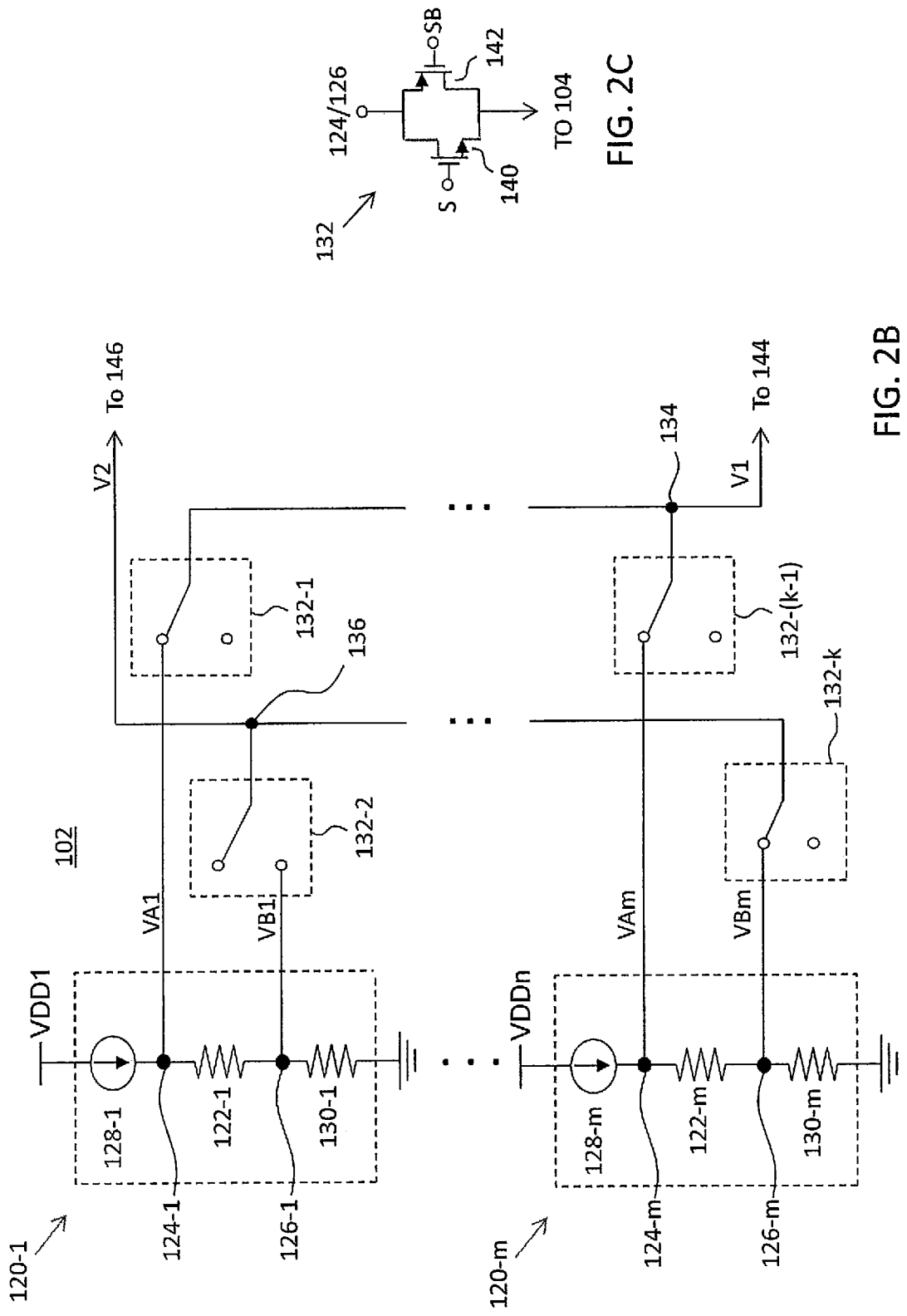

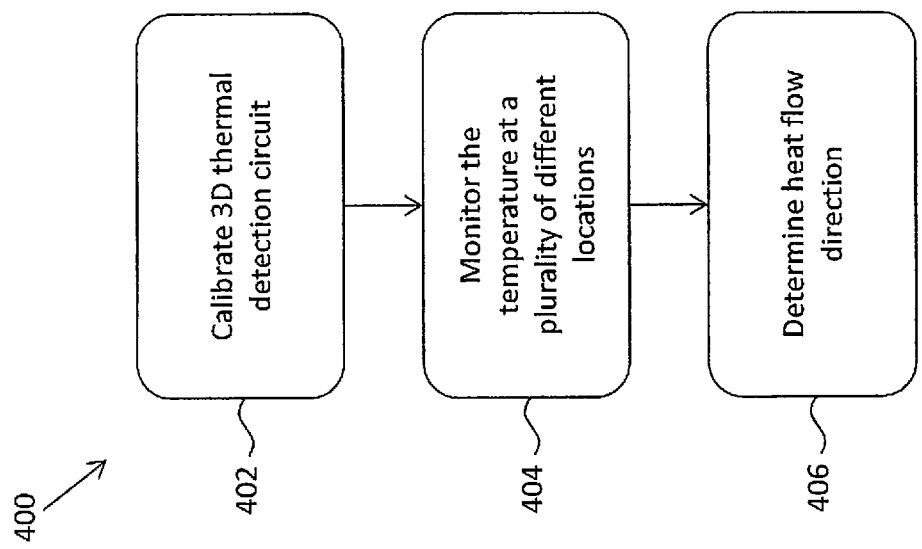

US 11,692,880 B2

3D THERMAL DETECTION CIRCUITS AND METHODS

CROSS-REFERENCE OF RELATED APPLICATION

This is a Continuation Application of U.S. patent application Ser. No. 16/378,277, filed Apr. 8, 2019 which is a Continuation Application of U.S. patent application Ser. No. 15/460,098, filed Mar. 15, 2017 which is a Divisional Application of U.S. patent application Ser. No. 14/055,909, filed on Oct. 17, 2013, the contents of which are incorporated by reference herein in their entireties.

BACKGROUND

Three-dimensional ("3D") integrated circuits ("ICs") include a plurality of vertically stacked chips or semiconductor substrates. Different types of circuits can be formed in the different chips or substrates. These circuits generate heat, which is conductively transferred throughout 3D ICs. The amount of heat dissipated into the chips and semiconductor substrates can generate reliability and electromigration ("EM") issues due to high-temperatures unless they are monitored.

BRIEF DESCRIPTION OF THE DRAWINGS

FIG. 2B is a circuit diagram of one example of sensing circuitry of a three-dimensional thermal detection circuit in accordance with some embodiments.

FIG. 2C is one example of a switch of sensing circuitry of a three dimensional thermal detection circuit in accordance with some embodiments.

FIG. 4 is a flow diagram of one example of a measurement process in accordance with some embodiments.

DETAILED DESCRIPTION

This description of the exemplary embodiments is intended to be read in connection with the accompanying drawings, which are to be considered part of the entire written description.

Figure 1:
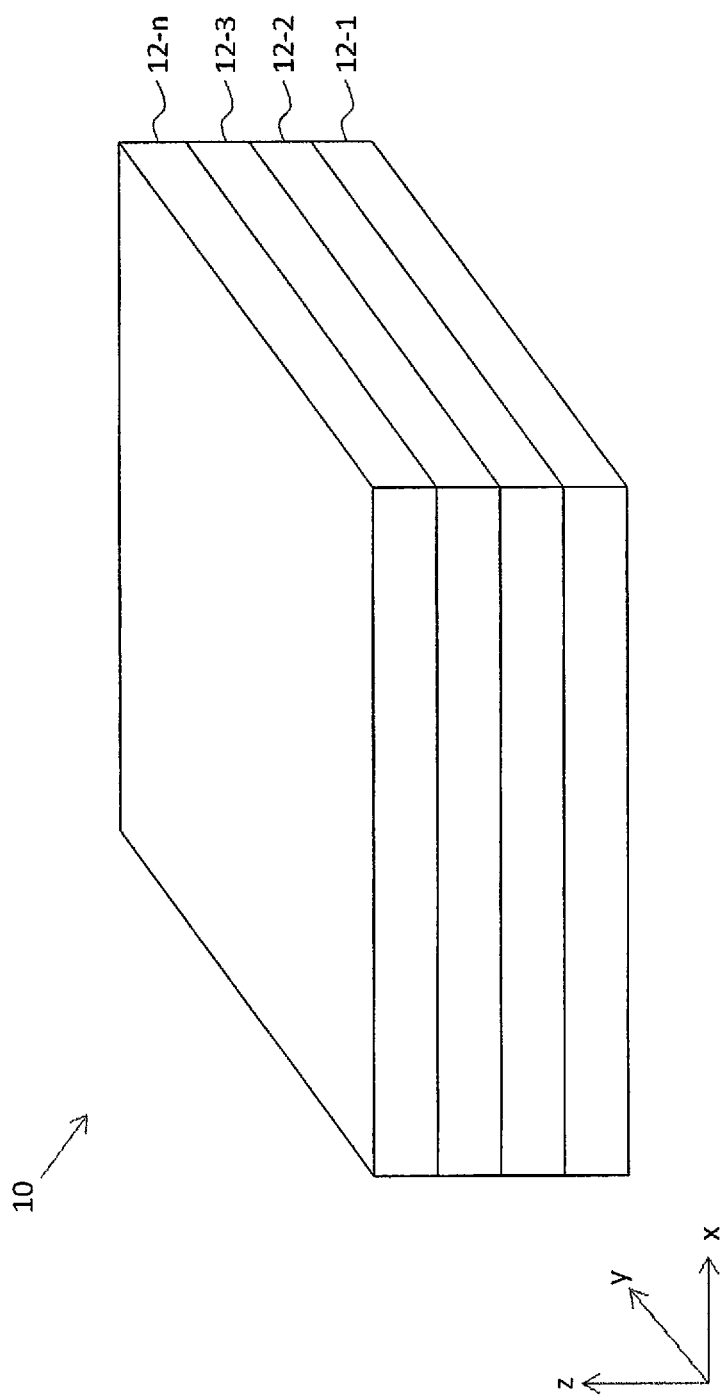
FIG. 1 is an isometric view of one example of a three-dimensional semiconductor integrated circuit in accordance with some embodiments.

FIG. 1 illustrates one example of a three-levels ("3D") semiconductor integrated circuit ("IC") 10. 3D IC 10 includes a plurality of levels 12-1, 12-2, 12-3, 12-n ("levels 12") that are vertically stacked on top of one another in the z-direction. In some embodiments, levels 12 are individual dies that are electrically coupled to one another with at least one through-substrate via ("TSV"), inter-layer via or inter-level via ("ILV"), or inter-device via ("IDV") (not shown). In some embodiments, 3D IC 10 is a 3D IC such that each level 12 is a respective "tier" where each tier includes a respective active device layer and a respective interconnect structure, which can include a plurality of metallization or conductive layers (e.g., M1, M2, etc.). Interlayer dielectric ("ILD") layers (not shown) can be disposed between directly adjacent tiers as will be understood by one of ordinary skill in the art.

Figure 2A:
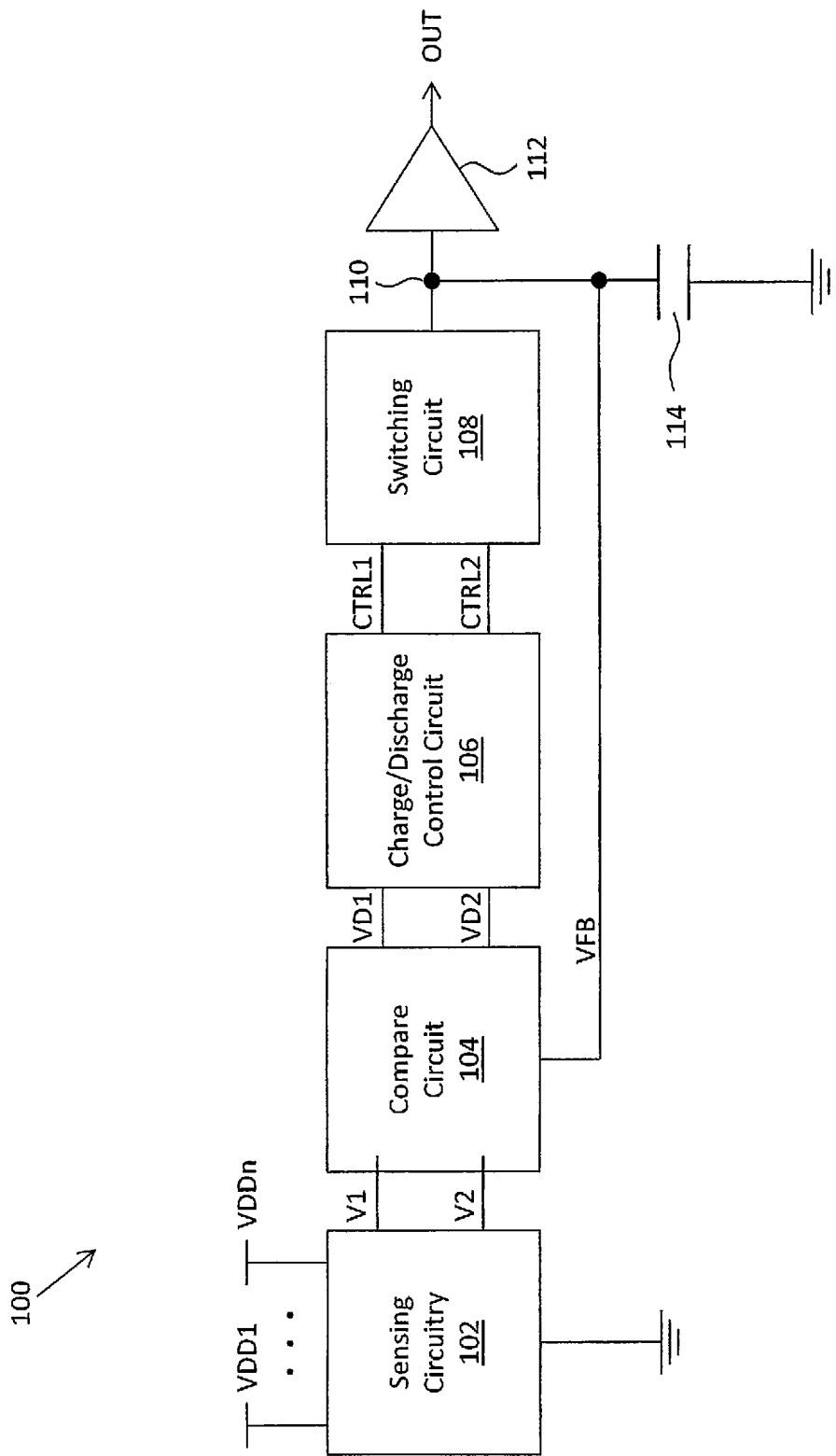
FIG. 2A is a block diagram of one example of a three-dimensional thermal detection circuit in accordance with some embodiments.

FIG. 2A is a block diagram of one example of a 3D thermal detection circuit 100 in accordance with some embodiments. In some embodiments, thermal detection circuit 100 includes a sensing circuitry 102 coupled to a number, n, of one or more power supply nodes, e.g., VDD1, VDD2, . . . , VDDn and ground, where n is an integer greater than or equal to one. As described in greater detail below, sensing circuitry 102 can be formed in one or more levels 12 of a 3D integrated circuit 10. Sensing circuitry 102 outputs a pair of voltages, V1 and V2, to compare circuit 104, which also receives a feedback voltage, VFB, received from feedback node 110. The output of compare circuit 104 is coupled to the input of charge/discharge ("C/D") control circuit 106, which has its output coupled to switching circuit 108. Switching circuit 108 has its output coupled to node 110, which is coupled to the input of an inverter or buffer circuit 112, to capacitor 114, and to compare circuit 104.

FIG. 2B is a more detailed circuit view of one example of sensing circuitry 102 in accordance with some embodiments. In some embodiments, sensing circuitry 102 includes a number, m, of sensing elements 120, where m is an integer greater than or equal to one. Each sensing element is coupled to a power supply node and includes one or more resistors, which have a resistance that changes based on temperature.

For example, sensing element 120-1 includes a resistor 122-1 coupled between nodes 124-1 and 126-1. Node 124-1 is configured to output a temperature-dependent voltage, VA1, and is coupled to power supply voltage VDD1 through a bias current source 128-1. Node 126-1 provides a second temperature-dependent voltage, VB1, and is coupled to ground through resistor 130-1. Sensing element 120-$m$ includes a resistor 124-$m$ coupled between nodes 124-$m$ and 126-$m$. Node 124-$m$ is configured to provide a temperature-dependent voltage, VAm, and is coupled to power supply voltage VDDn through a bias current source 128-$m$ Node 126-$m$ is configured to provide another temperature-dependent output voltage, VBm, and is coupled to ground through resistor 130-$m$. Resistors 122-1, 122-$m$, 130-1, 130-$m$ can be formed in several ways including, but not limited to, metal gate resistors, titanium nitride (TiN) resistors, poly gate resistors, substrate resistors, and as a resistor formed in a metallization layer, to list only a few possibilities.

As described in greater detail below, sensing elements 120 can be provided in a plurality of locations throughout a 3D IC 10. For example, sensing elements 120 can be located in one or more layers 12 of a 3D IC 10, including in a substrate at each of the layers and/or in metallization layers of one or more layers 12. In some embodiments, each layer 12 is powered by a respective power supply voltage VDD. For example, in some embodiments n equals m. However, in some embodiments, each layer 12 is powered by the same power supply voltage. By providing sensing elements 120 at a plurality of vertical (e.g., in the z-direction of FIG. 1) locations within 3D IC, the 3D thermal detection circuit 100 can provide local temperature detection and/or temperature gradients throughout the 3D IC 10 as will be described below with respect to FIG. 2F.

The temperature dependent voltages VA1, VB1, . . . , VAm, and VBm are provided to a respective switch 132-1, 132-2, . . . , 132-(k–1), 132-k (collectively "switches 132") for selectively routing the signal to compare circuit 104. For example, temperature dependent voltage VA1 is provided to switch 132-1, which selectively couples the voltage of VA1 to node 134, and temperature-dependent voltage VAm is provided to switch 132-(k–1) for selectively coupling the voltage to node 134. Temperature-dependent voltage VB1 is coupled selectively to node 136 by switch 132-2, and temperature-dependent voltage VBm is coupled selectively to node 136 by switch 132-k.

FIG. 2C illustrates one example of a switch 132 in accordance with some embodiments. As shown in FIG. 2C, switch 132 includes a first transistor 140 having a source coupled to an output node of a sensing element 120, e.g., node 124 or 126, and a drain coupled to the output node of switch 132, which is coupled compare circuit 104. In some embodiments, transistor 140 is a transistor of a first type, such as an PMOS transistor. Switch 132 also includes a second transistor 142 having a source coupled to the output node of the sensing element 120, e.g., node 124 or 126, and a drain coupled to the output node of switch 132. In some embodiments, transistor 142 is a transistor of a second type, such as an NMOS transistor.

The gates of transistors 140 and 142 are coupled to a control circuit (not shown) that provides complementary control signals S and SB. The control signals provided from the controller (not shown) control the selective coupling of a temperature-dependent voltage output from a sensing element to compare circuit 104. For example, to couple voltage VA1 to compare circuit 104, the controller provides a high voltage for control signal S and a low voltage for control signal SB. The high voltage of control signal S turns transistor 140 into a current-conducting "on" state, and the low voltage of control signal SB turns transistor 142 into a current-conducting "on" state such that the voltage at node 124-1 is provided to compare circuit 104. The other switches 132 can be configured in an orientation that decouples the respective output node of the sensing element 120 to which the switch is coupled from the compare circuit 104 by outputting a low voltage for control signal S and a high voltage for control signal SB.

Figure 2D:
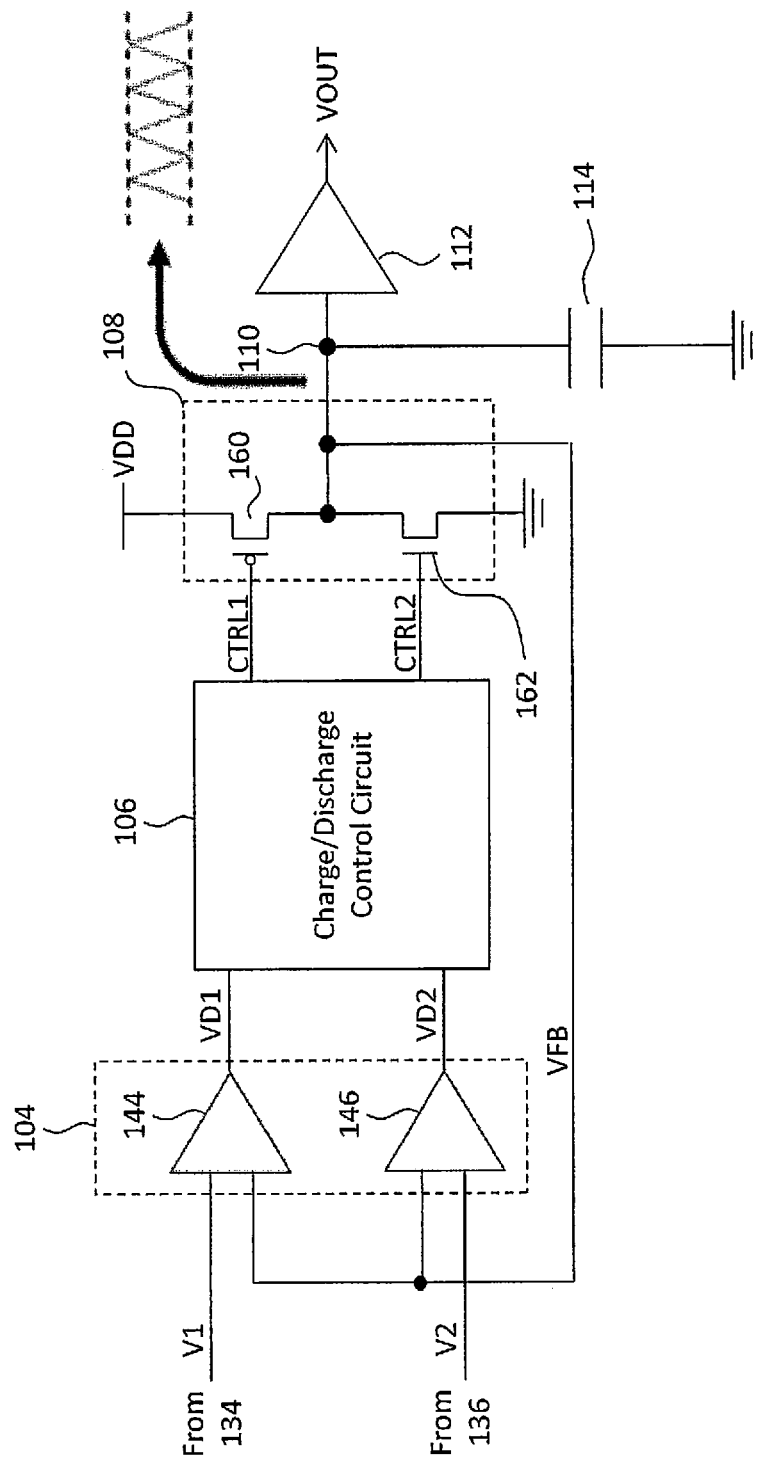
FIG. 2D is a circuit diagram of some of the functional components of a three-dimensional thermal detection circuit in accordance with some embodiments.

Turning now to FIG. 2D, compare circuit 104 includes a first comparator 144 and a second comparator 146. Comparator 144 includes a first input configured to receive a first voltage, V1, from sensing circuitry 102 from node 134 and a second input configured to receive feedback voltage VFB from node 110. Comparator 144 compares voltage V1 and the feedback voltage VFB and outputs a first difference voltage, VD1, to C/D control circuit 106. Comparator 146 has a first input configured to receive voltage V2, which is output by node 136 of sensing circuitry 102, and a second input configured to receive feedback voltage VFB from node 110. Comparator 146 is configured to compare voltage V2 and the feedback voltage VFB and output a second difference voltage, VD2, to C/D control circuit 106.

C/D control circuit 106 receives voltages VD1 and VD2 and outputs a control signal to switching circuit 108 for changing the orientation of switching circuit 108. In some embodiments, C/D control circuit 106 is implemented as an SR-latch including a pair of logic gates and a pair of inverters. For example, FIG. 2E illustrates one example of a C/D control circuit 106 in accordance with some embodiments.

Figure 2E:
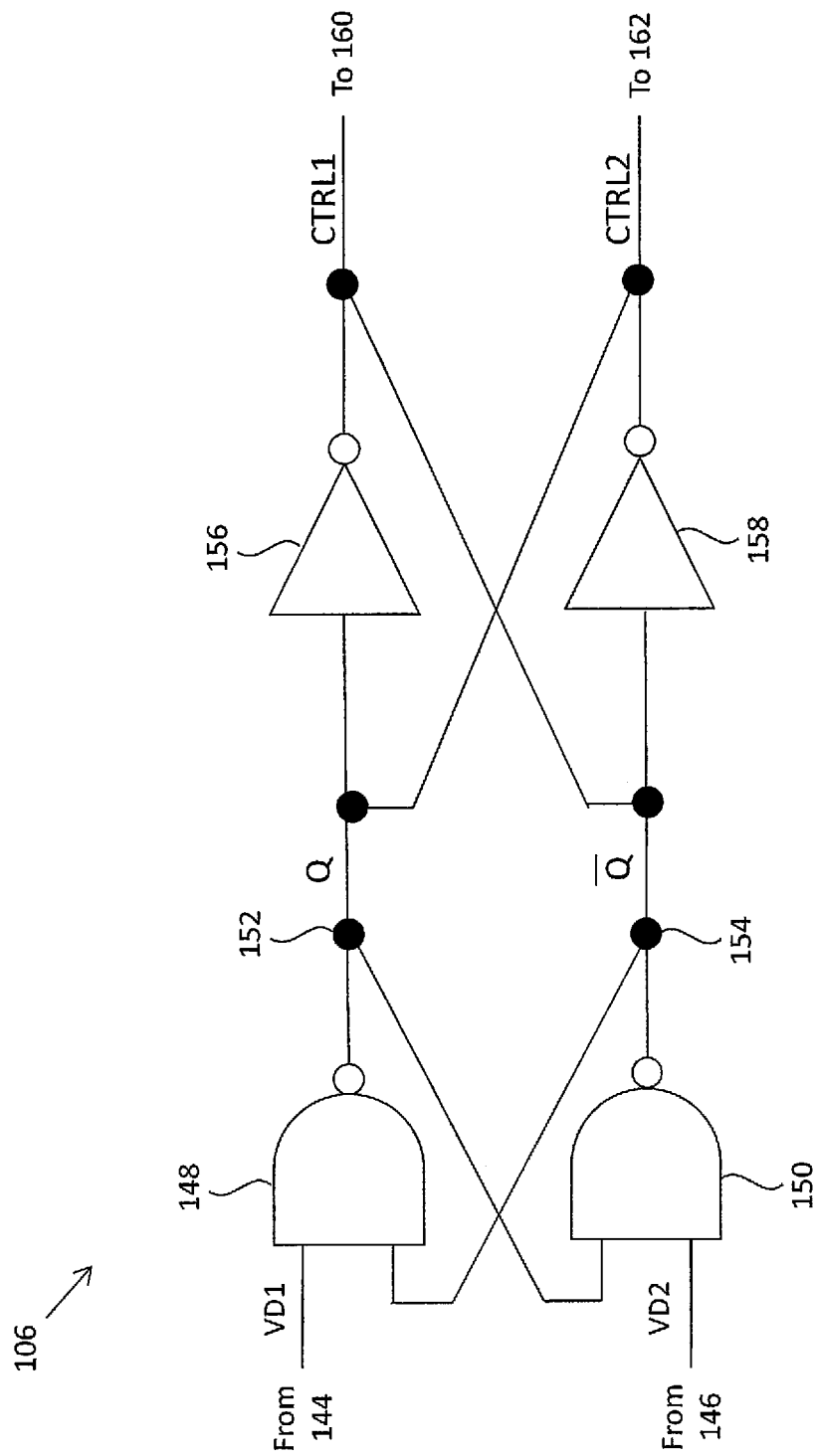
FIG. 2E is a circuit diagram of one example of a charge/discharge control circuit of a three-dimensional thermal detection circuit in accordance with some embodiments.

As shown in FIG. 2E, C/D control circuit 106 includes a first logic gate 148 having a first input coupled to the output of comparator 144, and a second logic gate 150 having a first input coupled to the output of comparator 146. In some embodiments, logic gates 148 and 150 are implemented as NAND gates as shown in FIG. 2E. However, logic gates 148, 150 can be implemented as other logic gates including, but not limited to, AND gates, NOR gates, and OR gates to list only a few possibilities. The output of logic gate 148 is coupled to node 152, and the output of logic gate 150 is coupled to node 154.

Node 152 is coupled to the input of inverter 156 and to the output of inverter 158, and node 154 is coupled to the output of logic gate 150 and to the input of inverter 156. The output of inverter 156 is coupled to the input of inverter 158 and to switching circuit 108. In some embodiments, inverter 156 is coupled to the gate of transistor 160 of switching circuit 108 as best seen in FIG. 2D. The output of inverter 158 is coupled to the input of inverter 156 and to the gate of transistor 162 as best seen in FIG. 2D.

Referring now again to FIG. 2D, switching circuit 108 includes transistors 160 and 162, which are coupled together at node 110. For example, transistor 160, which in some embodiments is a PMOS transistor, has its source coupled to a power supply, e.g., VDD, its gate coupled to the output of inverter 156 of C/D control circuit 106 (FIG. 2E), and its drain coupled to node 110. Transistor 162 has its source coupled to a low voltage source, such as ground or VSS, its drain coupled to node 110, and its gate coupled to the output of inverter 158 of C/D control circuit 106 (FIG. 2E). Node 110 is coupled to the input of an inverter or buffer circuit 112, to capacitor 114, and to compare circuit 104 to provide feedback voltage VFB.

Figure 2F:
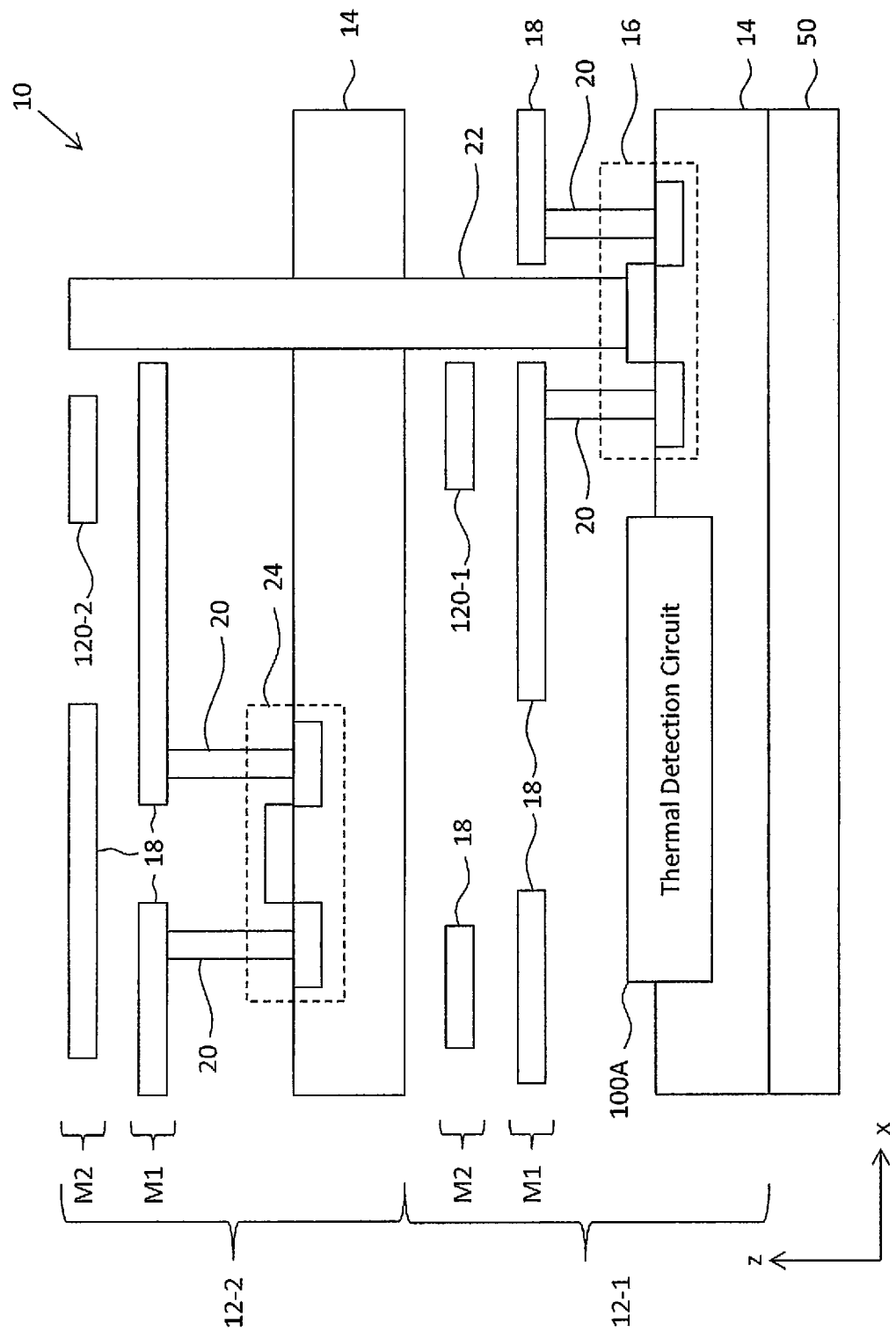
FIG. 2F is a cross-sectional view of one example of a layout of a three-dimensional thermal detection circuit in accordance with some embodiments.

As described above, the sensing elements 120 of 3D thermal detection circuit 100 can be disposed at various locations throughout a 3D IC 10. FIG. 2F is a cross-sectional view of one example of an implementation of a 3D thermal detection circuit 100 in a 3D IC 10 including two levels 12-1, 12-2 in accordance with some embodiments. As shown in FIG. 2F, levels 12-1, 12-2 include a semiconductor substrate 14 and a plurality of conductive layers M1 and M2.

Substrate 14 in level 12-1 is coupled to an optional heat sink 50 and includes a first circuit 16 and a portion 100A of a 3D thermal detection circuit 100 formed therein. In some embodiments, the portion 100A of thermal detection circuit 100 includes compare circuit 104, C/D control circuit 106, switching circuit 108, inverter or buffer 112, capacitor 114, and switches 132 of sensing circuitry 102. In some embodiments, portion 100A also includes at least one sensing element 120. Circuit 16 and portion 100A of thermal detection circuit 100 are laterally separated from one another in the x-direction.

Conductive layers M1, M2 of level 12-1 include a plurality of interconnect structures 18, which includes local vias 20. Although two conductive layers are shown, it is understood that level 12-1 can include fewer or more conductive layers. Although sensing element 120-1 is shown as being disposed in conductive layer M2 of level 12-1, one of ordinary skill in the art will understand that part of sensing element 120-1 (e.g., metal resistors 122, 130 implemented as metal resistors) are disposed in conductive layer 12-1, with other elements, e.g., current source 128, are formed in substrate 14 of layer 12-1. Additionally, other elements for temperature sensing can be located in other conductive layers, e.g., M1, M3, etc., and additional sensing elements 120 also can be provided in level 12-1.

Level 12-2 is disposed vertically adjacent to level 12-1 and is coupled electrically to level 12-1 by at least one via 22. In some embodiments, via 22 is an ILV, and in some embodiments, via 22 is a TSV. Level 12-2 includes a substrate 14 in which circuitry 24 is formed. Level 12-2 includes one or more conductive or metallization layers, e.g., M1, M2, etc., formed over substrate 14. Conductive layers M1, M2 of level 12-2 include a plurality of interconnect structures 18, which includes local vias 20. In some embodiments, a portion (e.g., resistors 122, 130, when implemented as metal resistors) of sensing element 120-2 is disposed in conductive layer M2 of level 12-2. In some embodiments, a portion of sensing element 120-2 is disposed in another conductive layer and/or additional sensing elements are provided in layer 12-2.

Figure 3:
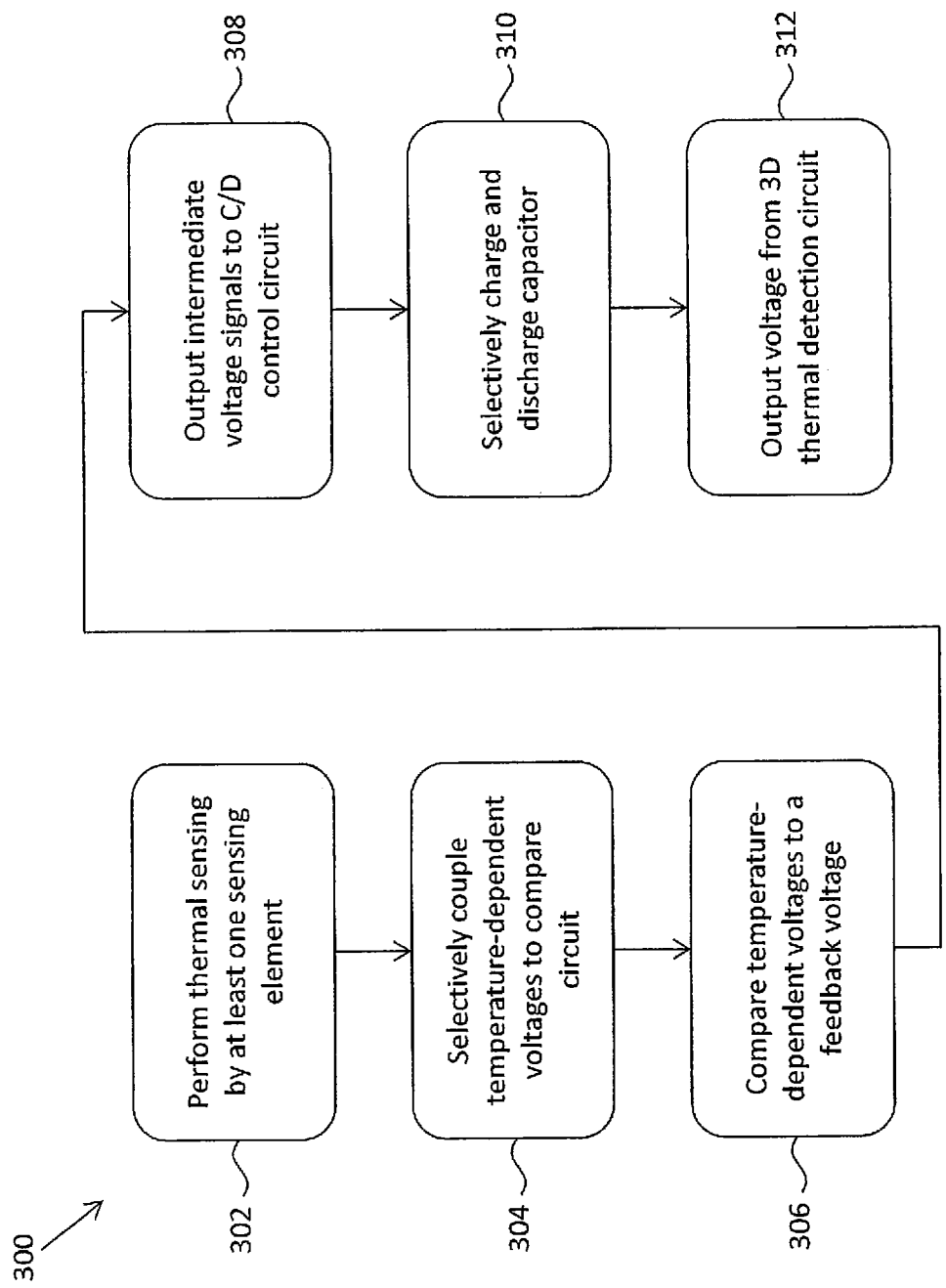
FIG. 3 is a flow diagram of one example of a method of providing thermal detection in a three-dimensional integrated circuit in accordance with some embodiments.

The operation of a 3D thermal detection circuit is described with reference to FIG. 3, which is a flow diagram of one example of a method of providing thermal detection in accordance with some embodiments. At block 302, thermal sensing is performed by at least one sensing element of a thermal detection circuit. As described above, a 3D thermal detection circuit can include one or more sensing elements 120 disposed at various vertical locations within the 3D IC. Each of the one or more sensing elements 120 is configured to provide a temperature-dependent voltage to the portion of thermal detection circuit 100A, which can include switches 132, compare circuit 104, C/D control circuit 106, and switching circuit 108.

For example, the one or more sensing elements, such as sensing element 120 illustrated in FIG. 2B, include resistors 122, 130 that are coupled between a voltage source VDD and ground and each have a resistance that varies based on their respective temperature. Each sensing elements outputs one or more temperature-dependent voltages, i.e., VA1, VA2, to switches 132.

At block 304, the temperature-dependent voltage(s) output by the one or more sensing elements 120 are coupled selectively to compare circuit 104. For example, switches 132 selectively couple temperature-dependent voltages, VA1 and VB1, to compare circuit 104. As described above, the orientation of switches 132 (FIGS. 2B and 2C) are adjusted in response to transistors 134, 136 receiving control signals from a switching control circuit (not shown) in some embodiments.

At block 306, the temperature-dependent voltages are compared to a feedback voltage. For example, as best seen in FIG. 2D, comparator 144 compares voltage V1 to the feedback voltage VFB and outputs a first difference voltage, VD1, to C/D control circuit 106. Comparator 146 is configured to compare voltage V2 to the feedback voltage VFB and output a second difference voltage, VD2, to C/D control circuit 106.

At block 308, intermediate voltage signals are output to C/D control circuit 106. As described above with respect to FIGS. 2D and 2E, comparator 144 outputs intermediate voltage VD1 to C/D control circuit 106 and comparator 146 outputs intermediate voltage VD2 to C/D control circuit 106. Intermediate voltage VD1 is based on a difference between temperature-dependent voltage V1 and feedback voltage VFB, and intermediate voltage VD2 is based on a difference between temperature-dependent voltage V2 and feedback voltage VFB.

At block 310, charge/discharge control signals are output to switching circuit 108. The charge/discharge control signals, e.g., CTRL1 and CTRL2, are based on the intermediate voltage signals VD1 and VD2. As best seen in FIG. 2E, intermediate signal VD1 is received at logic gate 148, and intermediate signal VD2 is received at logic gate 150. The intermediate signals VD1 and VD2 are latched through C/D control circuit 106 and are output as CTRL1 and CTRL2.

For example, in some embodiments, logic gates 148 and 150 for an SR latch with the following truth table:

| Node 144 | Node 146 | Node 152 | Node 154 |
|---|---|---|---|
| 0 | 0 | Restricted | Restricted |
| 0 | 1 | 1 | 0 |
| 1 | 0 | 0 | 1 |
| 1 | 1 | Maintain Logic Level | Maintain Logic Level |

Inverters 156 and 158 are configured to invert the logic level of the voltages at nodes 152 and 154, respectively, to provide control signals CTRL1 and CTRL2 to switching circuit 108.

At block 310, capacitor 114 is charged and discharged selectively in response to control signals received from C/D control circuit 106. For example and as best seen in FIG. 2D, control signals CTRL1 and CTRL2 are received at the gates of transistors 160 and 162, respectively, of switching circuit 108 to selectively couple feedback node 110 to VDD and to ground. Node 110 is coupled to VDD when CTRL1 is a logic zero, i.e., a low voltage signal, and is coupled to ground when CTRL2 is a logic one, e.g., a high voltage signal. FIG. 2D includes a voltage versus time graph as an inset, which shows that the voltage at node 110 can have a triangular shape as a result of capacitor 114 charging and discharging as node 110 is coupled to VDD and to ground. In some embodiments, capacitor 114 is not sensitive to temperature, i.e., is temperature insensitive, such that the charging and discharging of capacitor 114 is not varied by temperature. One example of a temperature insensitive capacitor is a metal-oxide-metal capacitor; however, other types of temperature insensitive capacitors can be implemented.

At block 312, an output voltage is output from the 3D thermal detection circuit. In some embodiments, the output voltage, VOUT, is provided to another circuit for further processing based on the pulse width of the output signal. For example, the output signal VOUT will have a square waveform in response to buffer or inverter circuit 112 as the inverter or buffer circuit changes its output based on the threshold voltage of the underlying devices, e.g., PMOS and NMOS transistor (not shown). The pulse width of the output signal will vary based on the temperature sensed by the sensing elements 120 such that the additional circuitry can measure the pulse width of output signal VOUT and determine the temperature of the 3D IC because the change in the pulse width is proportional to the change in voltage at node 110, which is based on the temperature sensed by sensing elements 120. Additionally, measuring the pulse width of the output signal can be used to detect a temperature change in the 3D IC.

FIG. 4 is a flow diagram of one example of a measurement process 400 in accordance with some embodiments. At block 402, the 3D thermal detection circuit is calibrated. In some embodiments, for example, the IC 10 including 3D thermal detection circuit 100 is subject to different environmental temperatures with the temperature and pulse width of the output signal being measured and recorded. The calibration can be performed at a number of locations such that the 3D thermal detection circuit 100 is calibrated for each of the sensing elements 120. For example, a hot spot circuit can be used to increase the temperature a number of different locations throughout 3D IC 10.

At block 404, the temperature at each of a plurality of different locations is measured. In some embodiments, the measurement at each of the plurality of locations is obtained by activating a particular sensing element and measuring the temperature in accordance with the process described above with respect to FIG. 3. Each sensing element 120 can be separately activated to monitor and measure the temperature at a particular location within the 3D IC 10.

At block 406, the heat flow direction is determined. For example, in some embodiments, the heat flow direction is determined by comparing the output data of the a sensing element 120 located at different distances from a hot spot circuit (not shown). The different temperatures measured by the different sensing elements 120 can identify which areas are hotter than others and the flow of heat through the 3D IC 10.

The disclosed circuits and methods advantageously enable heat detection in substrates, vias, and interconnects. Additionally, the disclosed circuits and methods provide the ability to monitor spatial thermal gradients using small circuits that are insensitive to 3D IC process-induced stresses such that the circuits can be implemented using silicon-on-insulator ("SOI") technology. The disclosed circuits and methods are also suitable for use with stacked integrated circuits having multiple supply voltages (VDDs), including those circuits having low power supply voltages, i.e., VDD<0.7 volts.

In an embodiment, a three-dimensional integrated circuit includes a first layer including at least one sensing element configured to output at least one temperature-dependent voltage; and a second layer disposed vertically with respect to the first layer and coupled to the first layer by at least one via. The second layer includes: a compare circuit configured to generate at least one intermediate voltage in response to comparing the at least one temperature-dependent voltage to a feedback voltage; a control circuit configured to generate at least one control signal in response to the intermediate voltage; and a switching circuit configured to couple a capacitor coupled to a feedback node to one of a first voltage supply and a second voltage supply in response to the at least one control signal to generate an output signal that is based on a temperature sensed by the sensing element.

In another embodiment, a three-dimensional integrated circuit includes a first layer including a first sensing element configured to output a first temperature-dependent voltage; a second layer including a second sensing element configured to output a second temperature-dependent voltage; and a third layer disposed vertically with respect to the first and second layers and coupled to the first and second layers by at least one through-substrate-via (TSV). The third layer includes a compare circuit configured to generate at least one intermediate voltage in response to comparing either one of the first and second temperature-dependent voltages to a feedback voltage; a control circuit configured to generate at least one control signal in response to the intermediate voltage; and a switching circuit configured to couple a capacitor coupled to a feedback node to one of a first voltage supply and a second voltage supply in response to the at least one control signal to generate an output signal that is based on a temperature sensed either by the first or second sensing element.

Yet in another embodiment, a method includes sensing a temperature at a first sensing element and outputting at least one temperature-dependent voltage in response; outputting at least one intermediate voltage from a compare circuit in response to comparing the at least one temperature-dependent voltage to a feedback voltage; selectively charging and discharging a capacitor coupled to a feedback node in response to at least one control signal that is based on the at least one temperature-dependent voltage; and outputting a signal having a pulse-width that is based on the temperature at the first sensing element.

Although the disclosed circuits and methods have been described in terms of exemplary embodiments, they are not limited thereto. Rather, the appended claims should be construed broadly, to include other variants and embodiments of the disclosed circuits and methods, which may be made by those skilled in the art without departing from the scope and range of equivalents of the circuits and methods.

What is claimed is:

1. A three-dimensional integrated circuit, comprising:
   a first layer including at least one sensing element configured to output at least one temperature-dependent voltage; and
   a second layer disposed vertically with respect to the first layer and coupled to the first layer by at least one via, the second layer comprising:
   a compare circuit configured to generate a first difference voltage and a second difference voltage in response to comparing the at least one temperature-dependent voltage to a feedback voltage;
   a control circuit configured to generate a first control signal and a second control signal in response to the first and second difference voltages, respectively, wherein the control circuit comprises a first logic gate having a first input and a second logic gate having a second input, the first input configured to receive the first difference voltage and the second input configured to receive the second difference voltage; and
   a switching circuit configured to selectively charge and discharge a capacitor using a first voltage supply and a second voltage supply, respectively, in response to the at least one control signal so as to generate an output signal that is based on a parameter sensed by the at least one sensing element, and wherein a voltage level of the capacitor is the feedback voltage that is fed back to the compare circuit.

2. The circuit of claim 1, further comprising a plurality of layers disposed vertically with respect to the first layer, each of the plurality of layers includes at least one respective sensing element configured to output at least one temperature-dependent voltage.

3. The circuit of claim 1, wherein the at least one sensing element comprises:
   a first switch coupled to a first node disposed between a power supply node and a first resistor, the first switch configured to couple the first node to a first input of compare circuit to generate the first difference voltage; and
   a second switch coupled to a second node disposed between the first resistor and a second resistor, the second switch configured to couple the second node to a second input of the compare circuit to generate the second difference voltage, wherein the first and second resistors each have a resistance that is based on a temperature of the first and second resistors, respectively.

4. The circuit of claim 1, wherein the control circuit includes a latch configured to receive a pair of difference voltages from the compare circuit and to output the at least one control signal in response.

5. The circuit of claim 4, wherein the switching circuit comprises:
   a first transistor having a source coupled to the first power supply, a drain coupled to a feedback node, and a gate configured to receive a first control signal of the at least one control signal output from the control circuit; and a second transistor having a source coupled to the second power supply, a drain coupled to the feedback node, and a gate configured to receive a second control signal of the at least one control signal output from the control circuit.

6. The circuit of claim 5, wherein the capacitor is a temperature insensitive capacitor.

7. The circuit of claim 1, wherein the first and second layers each include a respective substrate and interconnect, and wherein the at least one sensing element is disposed within the respective substrate or interconnect of the first layer.

8. A three-dimensional integrated circuit, comprising:
a first layer including a first sensing element configured to output a first temperature-dependent voltage;
a second layer including a second sensing element configured to output a second temperature-dependent voltage;
a third layer disposed vertically with respect to the first and second layers and coupled to the first and second layers by at least two through-substrate-vias (TSVs), the third layer including: a compare circuit configured to generate a first difference voltage in response to comparing the first temperature-dependent voltage to a feedback voltage and generate a second difference voltage in response to comparing the second temperature-dependent voltage to the feedback voltage, wherein the compare circuit comprises a first comparator have a first input configured to receive the first temperature-dependent voltage and a second input configured to receive the feedback voltage and a second comparator having a third input configured to receive the second temperature-dependent voltage and a fourth input configured to receive the feedback voltage; and
a switching circuit configured to selectively charge and discharge a capacitor using a first voltage supply and a second voltage supply, respectively, in response to the two control signals so as to generate an output signal that is based on temperatures sensed by the first and second sensing elements, and wherein a voltage level of the capacitor is the feedback voltage that is fed back to the compare circuit.

9. The circuit of claim 8, wherein the first and second sensing elements each comprises at least one resistor having a resistance that is based on a temperature of the at least one resistor.

10. The circuit of claim 8, further comprising:
a control circuit configured to generate first and second control signals in response to the first and second difference voltages, respectively, wherein the control circuit includes a latch configured to receive a pair of difference voltages from the compare circuit and to output the two control signals in response.

11. The circuit of claim 10, wherein the switching circuit comprises:
a first transistor having a source coupled to the first power supply, a drain coupled to a feedback node, and a gate configured to receive a first control signal of the at least one control signal output from the control circuit; and
a second transistor having a source coupled to the second power supply, a drain coupled to the feedback node, and a gate configured to receive a second control signal of the at least one control signal output from the control circuit.

12. The circuit of claim 11, wherein the switching circuit comprises:
a first transistor having a first source coupled to the first voltage supply, a first drain coupled to a feedback node, and a first gate configured to receive one of the two control signals output from the control circuit; and
a second transistor having a second source coupled to the second voltage supply, a second drain coupled to the feedback node, and a second gate configured to receive the other of the two control signals output from the control circuit.

13. The circuit of claim 11, wherein the capacitor is a temperature insensitive capacitor.

14. A method, comprising:
sensing temperatures of first and second sensing elements and outputting first and second temperature-dependent voltages in response;
outputting first and second difference voltages based on comparing the first and second temperature-dependent voltages to a feedback voltage, respectively;
outputting first and second control signals in response to the first and second difference voltages, respectively;
selectively charging and discharging a capacitor in response to the first and second control signals, respectively, and wherein a voltage level of the capacitor is the feedback voltage; and
outputting a signal indicative of the temperature of the first and second sensing elements, wherein the first and second sensing elements are disposed on a first layer of a three-dimensional integrated circuit and is coupled to other circuitry disposed on a second layer of a three-dimensional integrated circuit by a via.

15. The method of claim 14, wherein comparing the first and second temperature-dependent voltages to the feedback voltage comprises:
coupling a first node between a power supply and a first resistor to a first input of a first comparator, a second input of the first comparator being configured to receive the feedback signal; and
coupling a second node between the first resistor and a second resistor to a third input of a second comparator, a fourth input of the second comparator being configured to receive the feedback signal.

16. The method of claim 14, wherein the first and second sensing elements each comprises at least one resistor having a resistance that is based on a temperature of the at least one resistor.

17. The method of claim 14, wherein selectively charging and discharging the capacitor includes coupling the capacitor to one of a first voltage source and a second voltage source.

18. The method of claim 14, wherein the selectively charging and discharging the capacitor comprises using a first voltage supply and a second voltage supply, respectively, in response to the first and second control signals, respectively, so as to generate an output signal that is based on temperatures sensed by the first and second sensing elements.

19. The method of claim 18, wherein the selectively charging and discharging the capacitor further comprises:
receiving the first control signal at a first gate of a first transistor having a first source coupled to the first voltage supply and a first drain coupled to a feedback node; and receiving the second control signal at a second gate of a second transistor having a second source coupled to the second voltage supply and a second drain coupled to the feedback node.

20. The method of claim 19, wherein the capacitor is a temperature insensitive capacitor.

* * * * *